(12) United States Patent
Pelto

(10) Patent No.: US 11,459,847 B2
(45) Date of Patent: Oct. 4, 2022

(54) VARIABLE DENSITY ELEMENT RETAINER FOR USE DOWNHOLE

(71) Applicant: Halliburton Energy Services, Inc., Houston, TX (US)

(72) Inventor: Christopher Michael Pelto, Garland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 284 days.

(21) Appl. No.: 16/626,602

(22) PCT Filed: Feb. 5, 2019

(86) PCT No.: PCT/US2019/016636
§ 371 (c)(1),
(2) Date: Dec. 26, 2019

(87) PCT Pub. No.: WO2020/162883
PCT Pub. Date: Aug. 13, 2020

(65) Prior Publication Data
US 2021/0293113 A1  Sep. 23, 2021

(51) Int. Cl.
*E21B 33/12* (2006.01)
*B22F 3/105* (2006.01)
*B33Y 10/00* (2015.01)
*B33Y 80/00* (2015.01)

(52) U.S. Cl.
CPC .......... *E21B 33/1208* (2013.01); *B22F 3/105* (2013.01); *E21B 33/12* (2013.01); *E21B 33/1216* (2013.01); *B33Y 10/00* (2014.12); *B33Y 80/00* (2014.12)

(58) Field of Classification Search
CPC ... E21B 33/1208; E21B 33/12; E21B 33/1216
See application file for complete search history.

(56) References Cited

U.S. PATENT DOCUMENTS

| 5,676,384 | A | * | 10/1997 | Culpepper | .......... E21B 33/1216 277/342 |
| 5,678,635 | A | * | 10/1997 | Dunlap | ................. E21B 33/134 166/134 |
| 5,857,520 | A | | 1/1999 | Mullen et al. | |
| 7,373,973 | B2 | | 5/2008 | Smith et al. | |

(Continued)

OTHER PUBLICATIONS

International Application No. PCT/US2019/016636, "International Search Report and Written Opinion", dated Nov. 5, 2019, 12 pages.

*Primary Examiner* — Steven A MacDonald
(74) *Attorney, Agent, or Firm* — Kilpatrick Townsend & Stockton LLP

(57) ABSTRACT

A single structure usable as a backup shoe or element retainer in a packer assembly for sealing a wellbore can be fabricated using an additive manufacturing process. The single structure can have a high-density region and a low-density region having a density that is lower than the high-density region. The low-density region can be deformable to retain a position of another component downhole in a wellbore, such as an elastomeric element useable to expand to create the packer seal within the annulus of the wellbore. The high-density region can include a ribbed-structure to reduce circumferential force applied to the single structure.

15 Claims, 5 Drawing Sheets

(56) References Cited

U.S. PATENT DOCUMENTS

| | | |
|---|---|---|
| 2008/0060821 A1 | 3/2008 | Smith et al. |
| 2009/0194947 A1 | 8/2009 | Templeton et al. |
| 2009/0255690 A1 | 10/2009 | Conner et al. |
| 2012/0217025 A1* | 8/2012 | Shkurti ............... E21B 33/1216 |
| | | 166/134 |
| 2015/0204159 A1 | 7/2015 | Morehead |
| 2016/0061000 A1* | 3/2016 | Rochen ............... E21B 33/1216 |
| | | 166/138 |
| 2016/0138362 A1* | 5/2016 | Dockweiler .......... E21B 33/129 |
| | | 166/138 |
| 2017/0275963 A1* | 9/2017 | Harris ................. E21B 33/1216 |
| 2018/0179850 A1* | 6/2018 | Hou ....................... C08K 3/346 |
| 2018/0320473 A1* | 11/2018 | Xu ........................ E21B 33/128 |
| 2022/0025731 A1* | 1/2022 | Kohn ..................... E21B 33/10 |

* cited by examiner

US 11,459,847 B2

VARIABLE DENSITY ELEMENT RETAINER FOR USE DOWNHOLE

TECHNICAL FIELD

The present disclosure relates to devices usable in a wellbore environment for completion processes. More specifically, this disclosure relates to a variable density element retainer activated during the setting of packers in a wellbore.

BACKGROUND

A packer is a wellbore device that can be conveyed into a wellbore with a smaller initial outside diameter that can expand radially outward to seal the wellbore. The seal can isolate the annulus from the production conduit, enabling controlled production, injection, or treatment. A packer assembly can incorporate a device for securing the packer against the casing wall, such as a slip arrangement, and a device for creating a reliable hydraulic seal to isolate the annulus, typically by expandable elastomeric elements. The packer may be expanded by compressing the elastomeric elements using one or more element retainers that force the sides of the elastomeric elements to bulge outward against the casing wall.

Attempts to create a packer seal may fail multiple times during the design process before a successful seal can be formed. One cause of packer-setting failure can be deficient element retainers. Element retainers can be too rigid while the packer is being set, preventing the elastomeric elements from expanding sufficiently and causing a weak seal or no seal to be formed. Element retainers can be too weak once the packer is fully expanded such that the element retainer deforms excessively, buckling under the expansive force of the packer. Failure of an element retainer to perform these basic objectives may result in failed sealing attempts when setting a packer, especially in high-pressure, high-temperature environments.

DETAILED DESCRIPTION

Figure 1:
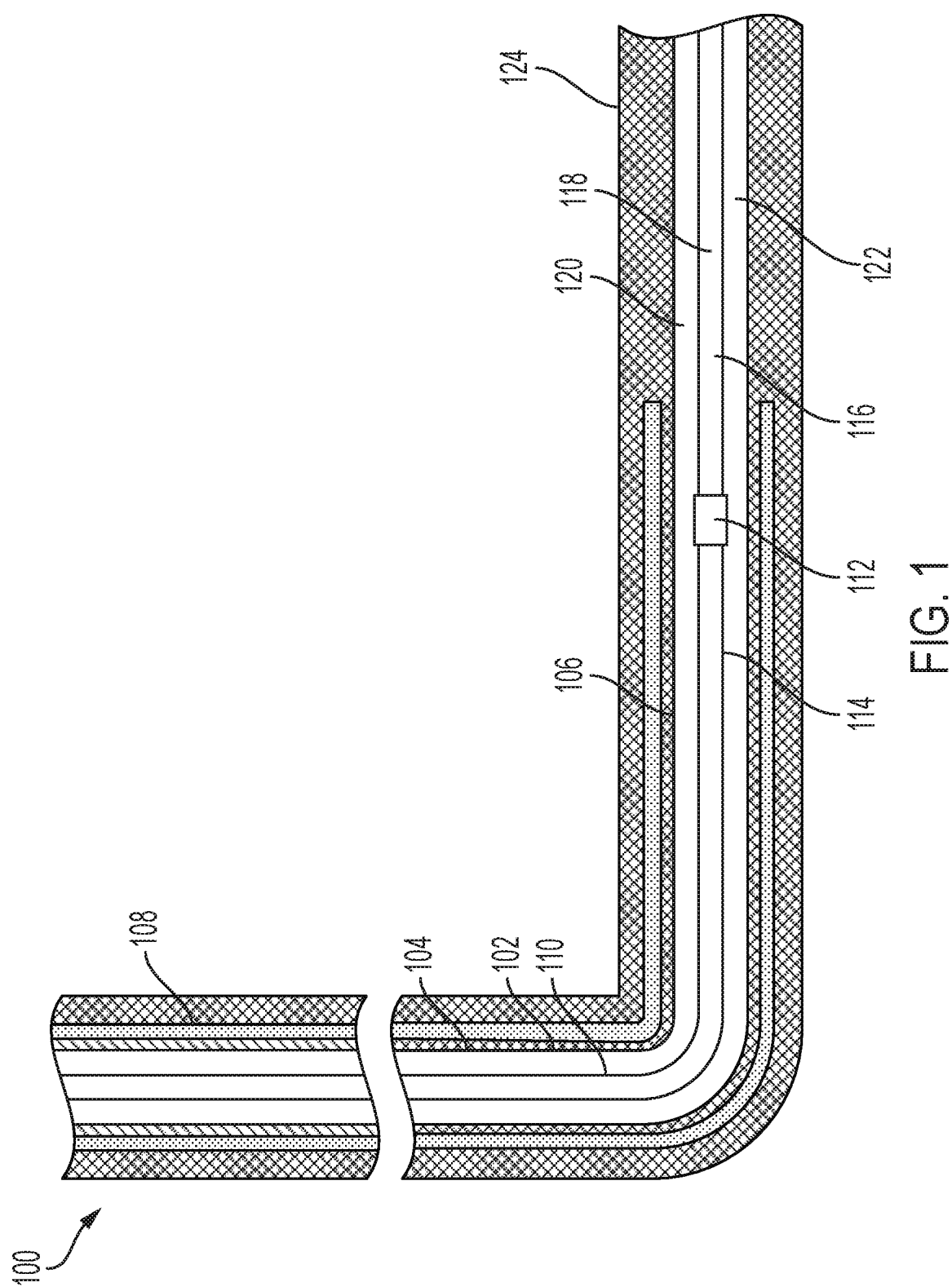
FIG. 1 is a cross-sectional view of an example of a wellbore assembly including a packer assembly according to some aspects of the present disclosure.

Certain aspects and features relate to a variable density element retainer activated during the setting of packers in a wellbore. A variable density element retainer, which can be a variable element density shoe, can be manufactured as a single structure having regions of varying densities. A high-density region of the element retainer can provide rigidity to retain an elastomeric element in place during and after the compression of the elastomeric element. A low-density region of the element retainer can be malleable enough to allow the elastomeric element to expand without the element retainer bending excessively that would otherwise cause the packer seal to fail. The single structure of varying densities can be used to set a packer in a wellbore to create a seal. The single structure of the variable density element retainer can be manufactured by applying heat to deposed layers of powder using a laser. The laser can create the high density and low-density regions by applying heat in different patterns. This can alternately be created in a material deposition machine in which the deposited material is placed in variable density lattice structures.

In some examples, the element retainer can be a backup support structure for an element package. The backup support structure can be formed as a single ring structure. Other backup rings can be too strong, preventing the packer from being set successfully, or too weak such that the backup ring becomes overpowered and bent by a packer during the setting process. By using a backup ring assembly that includes a single unified structure with regions of different densities, the chance for components to shift incorrectly or be compressed undesirably while setting the packer can be minimized.

In some examples, an additive manufacturing technique can print materials with varying density to form a single element retainer that exhibits the deformable functions of anti-extrusion devices, and stiffening rib structures to support a thinner and easier element to set solid barrier shoe. Examples of the variable density element retainer can include a non-uniform cross-sectional geometry and non-uniform metallic density to achieve the purposes of a series of parts. A variable density element shoe can improve packer element seal capability, reduce opportunity for elastomer extrusion, reduce setting forces, and reduce overall element-package part count compared to other high-pressure, high-temperature ("HPHT") designs and in applications implementing FKM (Fluoroelastomer) and FFKM (Perfluoroelastomer) materials that have a high propensity for element extrusion. A single element retainer according to some examples can provide for a variable density element retainer that can help reduce the number of failed packer setting attempts and with fewer components, reducing wellbore operational time and cost.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 depicts a cross-sectional view of a wellbore assembly 100 including a packer assembly 112 according to one example. The wellbore 102 can extend through various earth strata. The wellbore 102 can extend through a hydrocarbon-bearing subterranean formation 124. The wellbore 102 can have a substantially vertical section 104 and a substantially horizontal section 106. The substantially vertical section 104 and the substantially horizontal section 106 can include a casing string 108 cemented at an upper segment of the substantially vertical section 104 and through a portion of the substantially horizontal section 106. A tubing string 110 can extend from the surface within wellbore 102. The tubing string 110 can provide a flow path between a portion of the wellbore 102 and the surface.

A packer assembly 112 can be included between an upper portion 114 of the tubing string 110 and a lower portion 116 of the tubing string 110. The packer assembly 112 can include a variable density element retainer and one or more elastomeric elements that are expandable for creating a hydraulic seal for preventing fluid flow through the flow path. For example, the packer assembly 112 can prevent fluid flow between the upper portion 114 and the lower portion 116. The packer assembly 112 can be positioned in the wellbore such that the packer assembly 112, once set, creates a physical barrier. The packer assembly 112 may alternatively set in either the substantially horizontal section 106 or substantially vertical section 104 of the wellbore. In some examples, the packer assembly 112 may set within the casing string 108 or within an open drilled hole section 122. The packer assembly 112 and other downhole completion or production components and devices can be conveyed downhole on the tubing string 110. In some examples, the packer assembly 112 and other downhole equipment may be conveyed downhole using a wireline or coiled tubing. In additional or alternative examples, the packer assembly 112 can prevent fluid flow between an inner area 118 of the tubing string 110 and an external area 120 (e.g., annulus) of the tubing string 110.

Although FIG. 1 depicts a packer assembly 112 positioned along a tubing string 110, a packer assembly can be used separate from a tubing string in a wellbore. For example, the packer assembly 112 can be positioned in a wellbore and can include packers coupled to an exterior surface of the packer assembly 112 to prevent a fluid flow around the packer assembly 112. In additional or alternative aspects, the packer assembly 112 can be positioned external to a tubing string and can prevent a flow path between two portions of a wellbore. In alternative aspects, a packer assembly can be included in an inner area of a tubing string or as component of a tubing string. In some aspects, the packer assembly 112 can be used with other well tools in various well assemblies. For example, a packer assembly can be positioned in a simpler wellbore, such as a wellbore having only a substantially vertical section. In additional or alternative examples, a packer assembly can be positioned in a cased well. In additional or alternative aspects, a packer assembly can be positioned in a substantially vertical section of a wellbore. In some aspects, a wellbore can include more than one packer assembly. For example, the wellbore 102 can have multiple branching vertical or horizontal sections which may be isolatable from sections of the wellbore using multiple packer assemblies.

Figure 2:
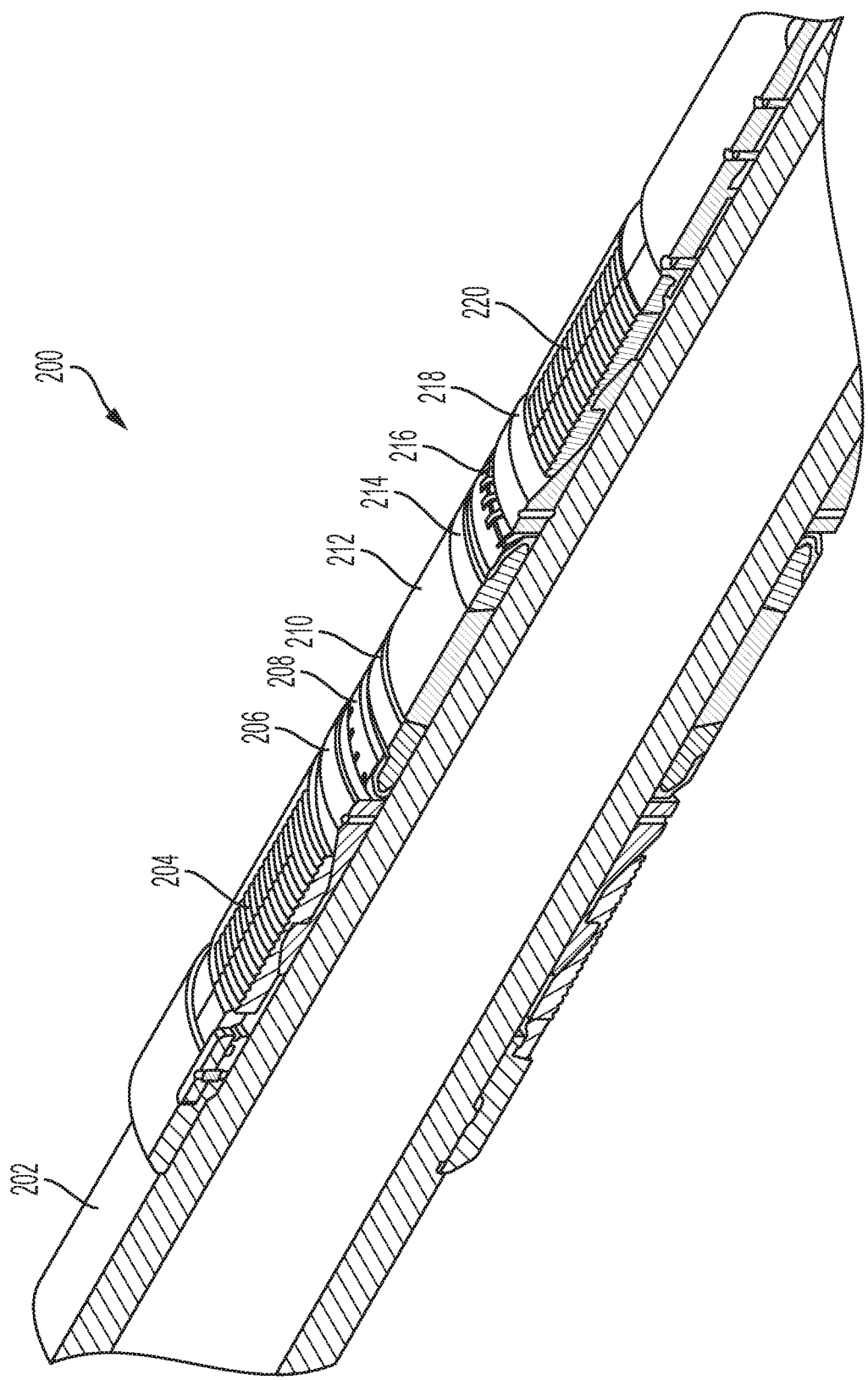
FIG. 2 is a perspective view of an example of a variable density element retainer in a packer assembly according to some aspects of the present disclosure.

FIG. 2 is a perspective view of a variable density element retainer 208 in a packer assembly 200 according to one example. The packer assembly 200 can be disposed within wellbore on a tubing string 202 during a completion phase of a wellbore. In some examples, the packer assembly can be disposed in a wellbore via wireline, coiled tubing, and other conveyance vehicles for positioning tools in a wellbore. The packer assembly 200 can be affixed to a length of the tubing string 202 while being deployed within the wellbore.

The packer assembly 200 can contain rigid and elastomeric components, where the rigid components can be controlled or otherwise manipulated to apply compressive force to the elastomeric elements. Applying compressive force to the elastomeric elements can cause the elastomeric elements to expand outwards radially, forming a seal within an annulus against a wall of tubing or a subterranean formation. In some examples, the variable density element retainer 208 or a device having a similar variable density structure may be used in other applications as understandable by one of ordinary skill in the relevant field of technology.

The packer assembly 200 can include an upper slip 204, an upper element retainer 206, variable density element retainers 208, 216, elastomeric elements 210, 212, 214, a lower element retainer 218, and a lower slip 220. The components of the packer assembly 200 can be positioned around the tubing string 202 circumferentially. The variable density element retainers 208, 216 may be referred to as a backup structure, or element shoe, in some contexts. The variable density element retainers 208, 216 can each have regions of varying density that can be implemented in HPHT environments. The upper element retainer 206 and lower element retainer 218 may be referred to as cones in some contexts, and can be solid steel wedges used for exerting force upon the inner components of the packer assembly 200.

The elastomeric elements 210, 212, 214 can be comprised of synthetic rubber (e.g., FKM, FFKM) that can expand radially outward from the tubing string 202 when applied with compressive force. The elastomeric elements 210, 214 can have a different coefficient of elasticity than the elastomeric element 212. For example, the elastomeric elements 210, 214 can be a harder rubber than the elastomeric element 212 that can be a softer rubber. The elastomeric elements 210, 214 can extrude less than the elastomeric element 212 when compressive force is applied, and the softer rubber of the elastomeric element 212 can extrude outward more than the elastomeric elements 210, 214 to better form a seal within an annulus against a casing or subterranean formation. In some examples, the elastomeric elements 210, 214 can also form a seal within an annulus against a casing or subterranean formation.

The packer assembly 200 can be lowered into a wellbore on a tubing string 202, or other conveyance vehicle, to form a seal with the elastomeric elements 210, 212, 214. The packer assembly 200 can be lowered by lowering the tubing string 202 into the wellbore. The packer assembly 200 can be lowered to a position within the wellbore to seal a section of the wellbore from shallower sections of the wellbore. When in position at the desired sealing location, the packer assembly 200 can initiate sealing operations.

Compressive force can be applied to the upper slip 204 and the lower slip 220 to being the process of sealing the annulus at a location within the wellbore. The upper slip 204 and lower slip 220 can be wedge-shaped devices with wickers, or teeth, on the outside surfaces of the upper slip 204 and the lower slip 220. The teeth of the upper slip 204 and the lower slip 220 can penetrate and grip the casing wall or subterranean formation wall when the packer is set. The upper element retainer 206 and lower element retainer 218 may be referred to as cones. The upper element retainer 206 and lower element retainer 218 can be beveled to match the back of the upper slip 204 and lower slip 220 to form a ramp that drives the upper slip 204 and lower slip 220 outward and into the casing or formation wall when setting force is applied to the packer assembly 200.

Once the upper slip 204 and lower slip 220 have anchored into the casing wall, additional applied setting force can energize the packer assembly 200 to create a seal between the components of the packer assembly 200 and the inside diameter of the casing. The upper element retainers 206 and lower element retainer can apply force to the variable density element retainers 208, 216 respectively. For example, the upper element retainer 206 can apply or transfer compressive force to a higher density region of the variable density element retainer 208. The higher density region of the variable density element retainer 208 can retain the placement of the elastomeric element 210.

The variable density element retainer 208 can have a lower density region that contacts the elastomeric element 210. The lower density region of the variable density element retainer 208 can be shaped to have an inner rung portion having a hook shape that can clamp against the elastomeric element 210 to form a seal between the variable density element retainer 208 and the elastomeric element 210. The lower density region of the variable density element retainer 208 can deform more easily than the higher density region of the variable density element retainer 208, such that the lower density region can expand radially outward as the elastomeric element 210 expands radially outward. The force applied to the higher density region of the variable density element retainer 208 can be transferred to the lower density region of the variable density element retainer 208 and into the elastomeric element 210. The lower density region of the variable density element retainer 208 may also allow the elastomeric element 210 to flow or extrude into the lower density region creating a composite metallic-elastomeric structure.

Similarly, the lower element retainer 218 can apply or transfer compressive force to a higher density region of the variable density element retainer 216. The higher density region of the variable density element retainer 216 can retain the placement of the elastomeric element 214. The variable density element retainer 216 can have a lower density region that contacts the elastomeric element 214. The lower density region of the variable density element retainer 216 can be shaped to have an inner rung portion having a hook shape that can clamp against the elastomeric element 214 to form a seal between the variable density element retainer 216 and the elastomeric element 214. The lower density region of the variable density element retainer 216 can deform more easily than the higher density region of the variable density element retainer 216, such that the lower density region can expand radially outward as the elastomeric element 214 expands radially outward. The force applied to the higher density region of the variable density element retainer 216 can be transferred to the lower density region of the variable density element retainer 216 and into the elastomeric element 214.

Upon compressive force being exerted upon the elastomeric elements 210, 214 by the variable density element retainers 208, 216 respectively, the elastomeric elements 210, 214 can transfer compressive force to both ends of the elastomeric element 212 that is conveyed along the length of the tubing string 202. The compressive force applied to the elastomeric element 212 by the elastomeric elements 210, 214 can cause the elastomeric element 212 to expand radially outward to form a seal within the annulus of the wellbore. In some examples, the variable density element retainers 208, 216 and elastomeric elements 210, 212, 214 can contact the well casing or formation wall to form a seal when being compressed. In some examples, the elastomeric elements 210, 212, 214 can contact the well casing or formation wall to form a seal when being compressed, and the variable density element retainers 208, 216 may not come into contact with the wall.

In some examples, the elastomeric element 210 can have a highest coefficient of elasticity, and the components of the packer assembly 200 can have a lower coefficient of elasticity than the subsequent component. For example, the elastomeric element 210 can have a highest coefficient of elasticity, and the elastomeric elements 210, 214 can have a lower coefficient of elasticity than the elastomeric element 210. In the same example, the variable density element retainers 208, 216 can have a lower coefficient of elasticity than the elastomeric elements 210, 214, and the upper element retainer 206 and lower element retainer 218 can have a lower coefficient of elasticity than the variable density element retainers 208, 216. In this example, the components of the packer assembly 200 having a decreasing coefficient of elasticity as compared to the elastomeric element 210, which can be the centermost component of packer assembly 200, can allow for expansion and sealing to being at the center of the packer assembly 200.

Expansion from the middle of the packer assembly 200 can allow for expansion of the elastomeric elements 210, 212, 214 and deformation of the variable density element retainers 208, 216 as needed to form a seal. For example, a well casing may be a short distance from the packer assembly 200, and a sufficient seal may be created with the elastomeric elements 210, 212, 214. In another example, the well casing may be a larger distance from the packer assembly 200, and more expansion of the elastomeric elements 210, 212, 214 may be required to form a sufficient seal, where the variable density element retainers 208, 216 may be deformable to allow for continued expansion of the elastomeric elements 210, 214.

As shown in FIG. 2, the components of the packer assembly 200 can be mirrored on both sides of the elastomeric element 212. For example, the upper slip 204 can be the mirror image of the lower slip 220, the upper element retainer can be the mirror-image of the lower element retainer 218, the variable density element retainer 208 can be the mirror-image of the variable density element retainer 216, and the elastomeric element 210 can be the mirror-image of the elastomeric element 214. In some examples, the mirrored components may include slight structural variations to account for varying functions because of the components being implemented at different depths of the wellbore.

In some examples, the packer assembly 200 may include fewer elements than those illustrated in FIG. 2. For example, a packer assembly may include the upper slip 204, the upper element retainer 206, the variable density element retainer 208, and the elastomeric elements 210, 212. This example packer assembly may not include the variable density element retainer 216, the lower element retainer 218, or the lower slip 220. In this example, compressive force may be applied to the elastomeric element 212 chained through the elastomeric element 210, the variable density element retainer 208, the upper element retainer 206, and the upper slip 204. The end of the elastomeric element 212 that would normally be applied with compressive force through the elastomeric element 214 may instead be in contact with a rigid structure. For example, the elastomeric element 210 can apply compressive force to elastomeric element 212, and the elastomeric element 212 can be squeezed between the elastomeric element 210 and a stationary component of the packer assembly (e.g., a modified element retainer). In some variations of this example, the elastomeric element 210 can have a higher coefficient of elasticity than the elastomeric element 212, such that the elastomeric element 210 can expand outwardly to contact the well casing or formation wall to create a seal before the elastomeric element 212 contacts the wall if the elastomeric element 212 contacts the wall. In other examples, the packer assembly 200 may not include upper slip 204 or lower slip 220, and may instead rely on associated equipment for anchoring aspects. In alternate versions, elastomeric element 212 may not be present, and in further aspects, only a single elastomeric element 210 may be deposed between the variable density element retainers 208, 216.

Figure 3:
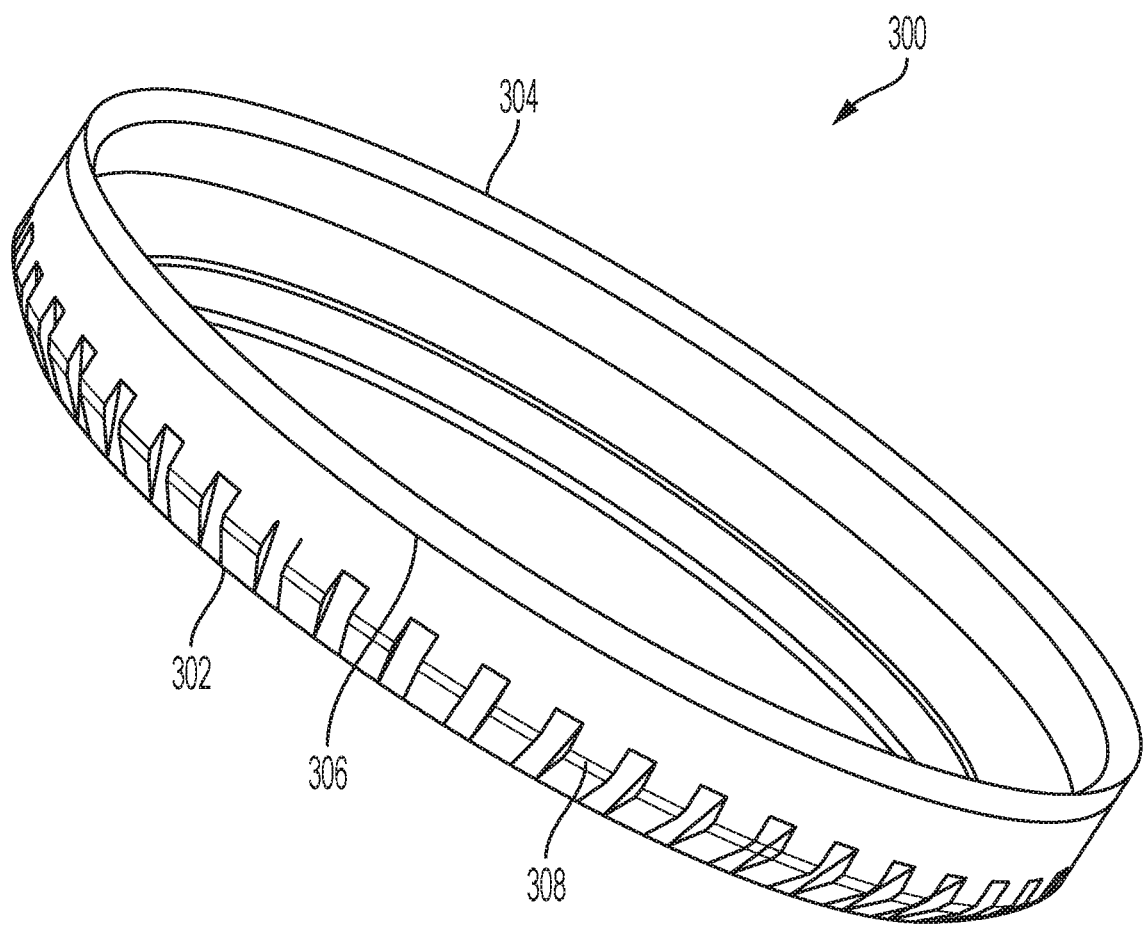
FIG. 3 is a perspective view of an example of a variable density element retainer according to some aspects of the present disclosure.

FIG. 3 is a perspective view of a variable density element retainer 300 according to one example. While depicted as two separate sections within FIG. 3, the high-density region 302 and low-density region 304 can be a single structure formed in a single manufacturing process, such that all portions of the variable density element retainer 300 can be formed together.

This variable density element retainer 300 can be a single piece element backup shoe. The variable density element retainer 300 can comprise the high-density region 302 as including a uniform revolved cross section for providing a continuous barrier, and the low-density region 304 that can be a deformable metallic structure. The low-density region 304 can be manufactured by utilizing an additive manufacturing ability to print a lattice structure, such as a mesh or honeycomb orientation, instead of a fully dense solid fill. The high-density region 302 and the low-density region 304 of the variable density element retainer 300 can be formed simultaneously layer by layer. A transition line 306 can exist between the high-density region 302 and the low-density region 304, such that a pattern of the additive manufacturing process can be changed to create transitions between portions of the high-density region 302 and the low-density region 304. The transition line 306 can be conveyed internally (not shown) throughout the single component that is the variable density element retainer 300.

The high-density region 302 can provide strength for the variable density element retainer 300 to be implemented within a packer assembly to create a seal in a wellbore according to examples. A ribbed-structure 308 around the outer rim of the high-density region 302 can increase the axial load bearing strength of the variable density element retainer 300. The ribbed-structure 308 can include protrusions that can be positioned circumferentially around an exterior of the high-density region 302 to reduce circumferential force applicable to the variable density element retainer 300. The high-density region 302 can be created in as dense of a material as possible, or can be of a sufficient density to perform functions within a packer assembly as described in example.

The low-density region 304 can provide compressibility for the variable density element retainer 300 to be implemented within a packer assembly to create a seal in a wellbore according to examples. The low-density region 304 can be manufactured in a different manner from the high-density region 302 to create to allow for more structural flexibility. For example, the low-density region 304 can be fabricated in a matrix or mesh pattern, such that the mesh can be bendable when applied with significant force. The additive manufacturing process can include a way to expel loose manufacturing powder from between the mesh to remove the loose powder from the low-density region 304. In some examples, the out portions of the low-density region 304 can be fabricated to form a solid skin or surface, and the skin of the low-density region 304 can encapsulate loose powder. This can allow the low-density region 304 to act as a sandbag that can absorb the impact of compressible force while retaining the ability to bend or reshape under the force. In some examples, the low-density region 304 can include a mesh with a skin, such that the mesh contains loose powder.

In some examples, low-density region 304 can be fabricated in such a way as to trap the elastomeric material (e.g., elastomeric elements usable in packer sealing) within its structure during a packer setting phase and to maintain seal energy during temperature cycling that would normally shrink the elastomeric material volume. For example, compressive force can be applied to the high-density region 302, which can transfer the energy of the applied force to an elastomeric element through the low-density region 304. The low-density region 304, which can be in a mesh configuration, can allow the elastomeric element to begin to enter the spatial voids between the mesh network as more force is applied. This can allow the variable density element retainer 300 to better grip and retain any elastomeric elements in contact with the low-density region 304.

Figure 4:
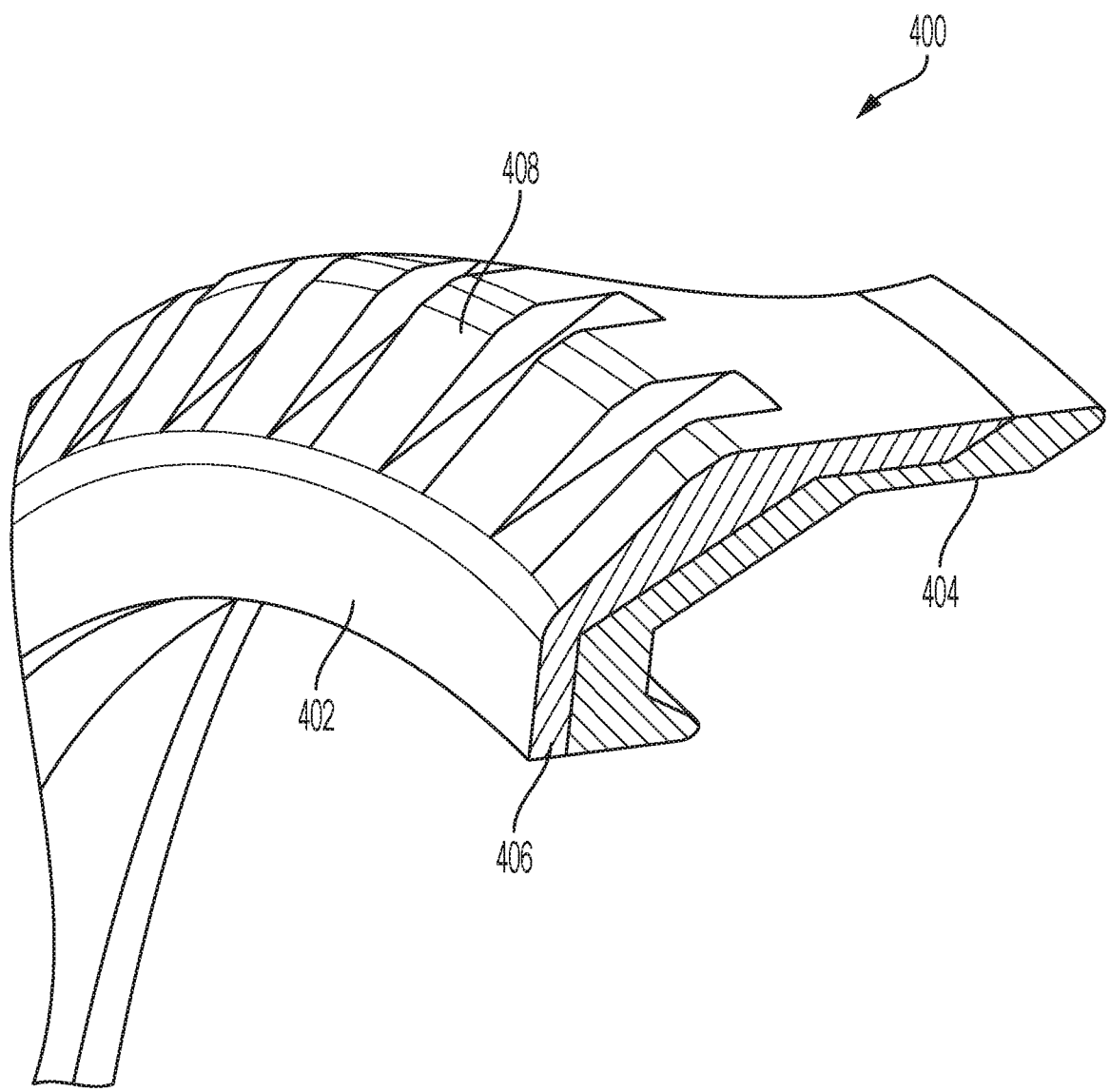
FIG. 4 is a cutaway perspective view of a portion of an example of a variable density element retainer according to some aspects of the present disclosure.

FIG. 4 is a cutaway perspective view of a portion of a variable density element retainer 400 according to one example. The variable density element retainer 400 can have a high-density region 402 and a low-density region 404. The high-density region 402 can include a uniform cross section 406 and a ribbed-structure 408. During a packer setting process, the uniform cross section 406 can allow the variable density element retainer 400 to deform outwards to the well casing or formation wall. The ribbed-structure 408 can add stiffness as a bridge between an element retainer and the setting chamber ID (e.g., elastomeric element). The low-density region 404 can deform and seal off extrusion gaps left between the uniform cross section 406 and a mandrel of the packer assembly and between the high-density region 402 and the setting chamber ID.

The ribbed-structure 408 can provide additional structural support to affect how force is applied and conveyed through the high-density region 402. Force can be applied to the high-density region 402 to cause the high-density region 402 to be stretched circumferentially, such that radial force outward can be larger than compressive force exerted longitudinally downhole. By manufacturing the ribbed-structure 408 to include gaps, or depressed areas, between each rib, circumferential force can be reduced, which can reduce the outward stretching of the high-density region 402. The ribbed-structure 408 can help reduce longitudinal stretching, such that the elastomeric elements of the packer can be forced to expand while the variable density element retainer 400 retains its shape. The gaps between the ribs of the ribbed-structure 408 can cause the high-density element to be strong against bending outward radially, such that the bottom of the high-density region 402 does not bend outward during compression of an elastomeric element retained by the low-density region 404.

The high-density region 402 can be a high strength steel material, such as a 35 ksi (kilopound per square inch), or 241.317 MPa (megapascals), material. In some examples, the high-density region 402 can have a density of 90% to 100%. In some examples, the low-density region 404 can have a density of 25% to 50%. Percentage densities of the high-density region 402 and the low-density region 404 can be any density as would be determinable by one of ordinary skill in the relevant field of technology.

In some examples, the high-density region 402 can be fabricated using petal plates, which are flat plates that have longitudinal slits. The petal plates can open when applied with force to reduce the amount of circumferential energy transferable throughout the high-density region 402, causing the high-density region 402 to retain its shape with little or no deformation. One or more petal plates may be used within the high-density region 402, where the longitudinal slits of one petal plate can be offset from longitudinal slits of an adjacent petal plate. This configuration can prevent the slits from lining up with each other, allowing the multiple petal plates to better close gaps within the high-density region 402.

Figure 5:
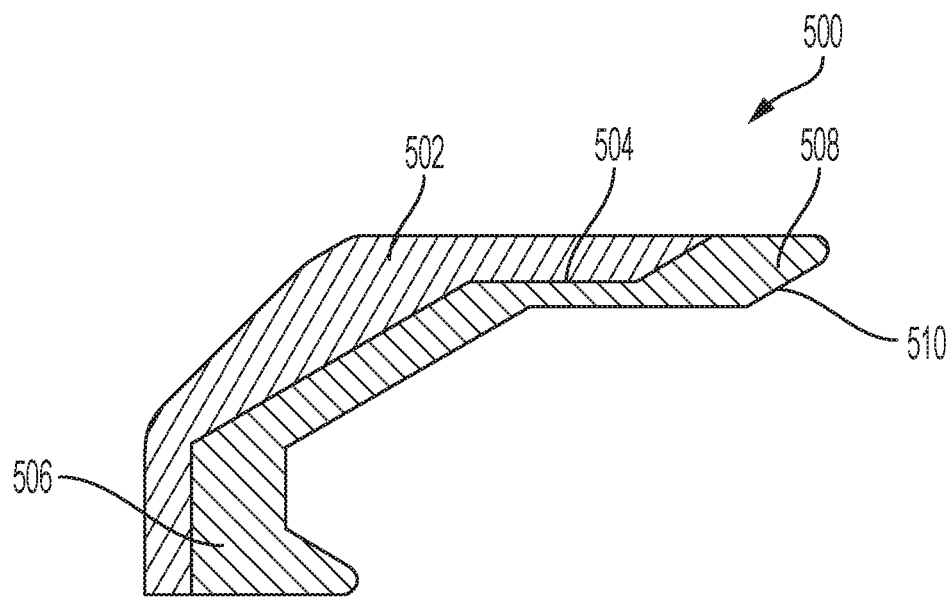
FIG. 5 is a cross-sectional view of an example of a variable density element retainer according to some aspects of the present disclosure.

FIG. 5 is a cross-sectional view of a variable density element retainer 500 according to one example. The variable density element retainer 500 can include a high-density region 502 and a low-density region 504. The low-density region 504 can include a nose region 506. The nose region 506 can push down and clamp against a packer assembly mandrel to seal off a setting chamber ID. The nose region 506 can hook into an elastomeric element to help retain the elastomeric element in place during compression of a packer-sealing event.

An outer edge 508 of the low-density region 504 can be pushed radially outward towards the well casing or formation wall during compression of an elastomeric element. For example, an elastomeric element can be contained against a tubing string using the nose region 506. The high-density region 502 can be applied with compressive force, causing energy to be transferred through the low-density region 504 and into the elastomeric element. As the elastomeric element is compressed to expand radially outward, the exterior of the elastomeric element can push against an inner edge 510 of the low-density region 504, which can cause the low-density region 504 to deform and bend outward towards the well casing or formation wall. In some examples, the outer edge 508 can come into contact with the well casing or formation wall, creating a seal with the low-density region 504.

Figure 6:
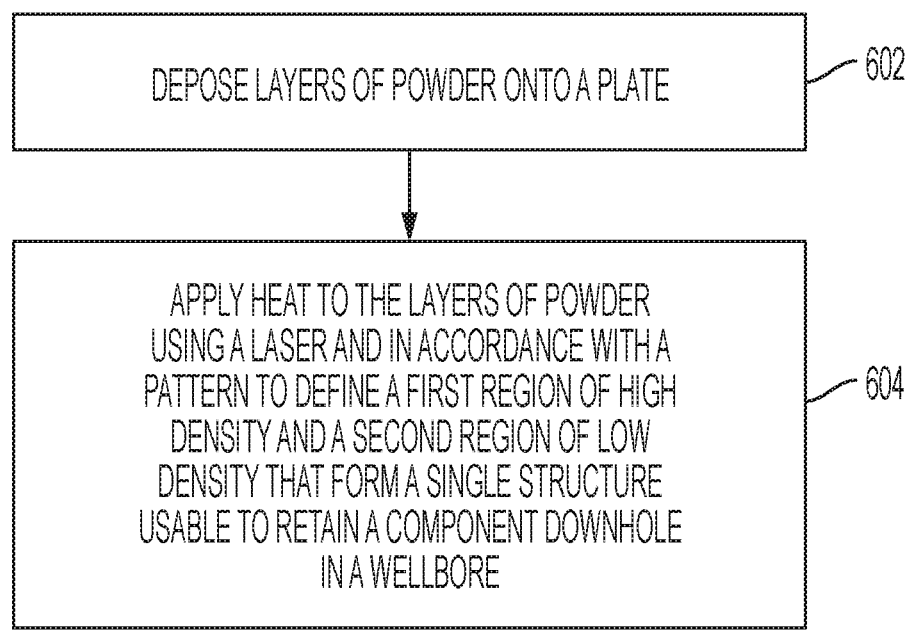
FIG. 6 is a flowchart of a process for manufacturing a variable density element retainer according to some aspects of the present disclosure.

FIG. 6 is a flowchart of a process for manufacturing a variable density element retainer according to one example. Some processes for manufacturing a variable density element retainer can be described according to previous examples.

In block 602, layers of powder are deposed onto a plate. A first layer of powder can be deposed onto a plate to form a base of a variable density element retainer. The powder for each layer can be the same material, such as INCOLOY® alloy 925.

In block 604, heat is applied to the layers of powder using a laser and in accordance with a pattern to define a first region of high density and a second region of low density that form a single structure usable to retain a component downhole in a wellbore. A three-dimensional sintering process can be used to fabricate a variable density element retainer comprising a first region with a high density and a second region with a low density. The first layer of powder laid onto the plate in block 602 can be applied with heat to sinter the powder into a specific pattern creating a specific density. The base layer of powder can be sintered to the base plate, and then cut from the base plate after completing the deposition and sintering process for all layers of the variable density element retainer. The processes described in blocks 602 and 604 can be repeated to lay powder and then heat the powder to build up the total volume of the variable density element retainer, where each new layer of powder is deposed onto the previously heated layer of powder.

A printing pattern of the sintering process can define the density of the variable density element retainer. A single layer of powder can be sintered or melted to have regions of low density and high density. For example, a sintering device can be controlled to sinter different patterns to create different densities throughout a layer. For example, the outer layer of a portion of the high-density region can be sintered, the deposition process can move inward towards where the lower density region is to be sintered, and change the sintering pattern to create the a portion of the lower density region within a single deposed layer.

The high-density region can be created by sintering all or a majority of the powder at an area corresponding to the high-density region, such that the region is fully dense. The low-density region can be created by sintering the powder at an area corresponding to the low-density region sintering in a pattern, such as a mesh. When sintering in a pattern different from a fully dense pattern, some of the loose powder may remain after the sintering process. For sintered regions of the variable density element shoe that are not fully dense and include remnants of powder, the powder can be removed before applying the next layer of powder to be sintered. In some examples, the powder can be left within a skin or mesh of the low-density region as described by examples. For example, the layers of sintered powder creating the low-density region can be sintered to create a solidified exterior encapsulating loose powder that was not sintered and was not removed during the additive manufacturing process.

In some aspects, systems, devices, and methods for a variable density element retainer activated during the setting of packers in a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is an element retainer comprising: a single structure having a high-density region and a low-density region having a density that is lower than the high-density region, the low-density region being deformable in retaining a position of another component downhole in a wellbore.

Example 2 is the element retainer of example 1, wherein the element retainer is useable in a packer element system to form a seal within an annulus in the wellbore, the packer element system comprising: a second element retainer positionable against the high-density region to apply force to the single structure; and a first elastomeric element positionable against the low-density region and compressible by the single structure in response to the second element retainer applying force to the single structure, the first elastomeric element having a first coefficient of elasticity.

Example 3 is the element retainer of any of examples 1-2, wherein the packer element system further comprises: a second elastomeric element compressible by the first elastomeric element in response to the single structure applying force to the first elastomeric element, the second elastomeric element having a second coefficient of elasticity that is different than the first coefficient of elasticity.

Example 4 is the element retainer of any of examples 1-3, wherein the high-density region comprises protrusions positionable circumferentially around an exterior of the high-density region to reduce circumferential force applicable to the element retainer overcome during setting.

Example 5 is the element retainer of any of examples 1-4, wherein the low-density region comprises an inner rung portion having a hook shape for clamping against a mandrel to form a seal.

Example 6 is the element retainer of any of examples 1-5, wherein the low-density region forms a mesh configuration.

Example 7 is the element retainer of any of examples 1-6, wherein the low-density region comprises: loose powder; and a solidified exterior encapsulating the loose powder.

Example 8 is the element retainer of any of examples 1-7, wherein the element retainer is an element shoe.

Example 9 is a system comprising: an element retainer comprising a single structure having a high-density region and a low-density region having a density that is lower than the high-density region, the low-density region being deformable in retaining a position of a first elastomeric element downhole in a wellbore; a second element retainer positionable against the high-density region to apply force to the single structure; and the first elastomeric element positionable against the low-density region and compressible by the single structure in response to the second element retainer applying force to the single structure, the first elastomeric element having a first coefficient of elasticity.

Example 10 is the system of example 9, further comprising: a second elastomeric element compressible by the first elastomeric element in response to the single structure applying force to the first elastomeric element, the second elastomeric element having a second coefficient of elasticity that is different than the first coefficient of elasticity.

Example 11 is the system of any of examples 9-10, further comprising: a third element retainer comprising a second single structure having a second high-density region and a second low-density region having a density that is lower than the second high-density region, the second low-density region being deformable in retaining a position of a third elastomeric element downhole in the wellbore; and a fourth element retainer positionable against the second high-density region to apply force to the second single structure, the third elastomeric element positionable against the second low-density region and compressible by the second single structure in response to the fourth element retainer applying force to the second single structure, the third elastomeric element having a third coefficient of elasticity, wherein the second elastomeric element is compressible by the third elastomeric element in response to the second single structure applying force to the third elastomeric element, and wherein the second elastomeric element is positionable between the first elastomeric element and the third elastomeric element.

Example 12 is the system of any of examples 9-11, wherein the system is a packer useable to form a seal within an annulus in the wellbore, and wherein the element retainer is an element shoe.

Example 13 is the system of any of examples 9-12, wherein the high-density region comprises protrusions positionable circumferentially around an exterior of the high-density region to reduce circumferential force applicable to the element retainer overcome during setting.

Example 14 is the system of any of examples 9-13, wherein the low-density region comprises an inner rung portion having a hook shape for clamping against the first elastomeric element to form a seal, and wherein the low-density region is a mesh configuration.

Example 15 is the system of any of examples 9-14, wherein the low-density region comprises: loose powder; and a solidified exterior encapsulating the loose powder.

Example 16 is a method of manufacturing comprising: deposing layers of powder onto a plate; and applying heat to the layers of powder using a laser and in accordance with a pattern to define a first region of high density and a second region of low density that form a single structure usable to retain a component downhole in a wellbore.

Example 17 is the method of manufacturing of example 16, wherein a layer of powder of some of the layers of powder applied with heat comprises the first region of high density and the second region of low density.

Example 18 is the method of manufacturing of any of examples 16-17, wherein applying heat to the layers of powder in accordance with a pattern includes applying heat to define the second region of low density in a mesh pattern.

Example 19 is the method of manufacturing of example 18, further comprising: removing loose powder that was not applied with heat from within the second region of low density in the mesh pattern.

Example 20 is the method of manufacturing of any of examples 16-19, wherein applying heat to the layers of powder in accordance with a pattern includes applying heat to define the second region of low density having a solidified exterior encapsulating loose powder.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An element retainer for a wellbore comprising:
a continuous single structure consisting of a single material and comprising:
a high-density region of the single material; and
a low-density region of the single material having a density that is lower than the high-density region, the low-density region being deformable in retaining a position of another component downhole in the wellbore.

2. The element retainer of claim 1, wherein the element retainer is useable in a packer element system to form a seal within an annulus in the wellbore, the packer element system comprising:
a second element retainer positionable against the high-density region to apply force to the single structure; and
a first elastomeric element positionable against the low-density region and compressible by the continuous single structure in response to the second element retainer applying force to the continuous single structure, the first elastomeric element having a first coefficient of elasticity.

3. The element retainer of claim 2, wherein the packer element system further comprises:
a second elastomeric element compressible by the first elastomeric element in response to the continuous single structure applying force to the first elastomeric element, the second elastomeric element having a second coefficient of elasticity that is different than the first coefficient of elasticity.

4. The element retainer of claim 1, wherein the high-density region comprises protrusions positionable circumferentially around an exterior of the high-density region to reduce circumferential force applicable to the element retainer overcome during setting.

5. The element retainer of claim 1, wherein the low-density region comprises an inner rung portion having a hook shape for clamping against a mandrel to form a seal.

6. The element retainer of claim 1, wherein the low-density region forms a mesh configuration.

7. The element retainer of claim 1, wherein the low-density region comprises:
loose powder; and
a solidified exterior encapsulating the loose powder.

8. The element retainer of claim 1, wherein the element retainer is an element shoe.

9. A wellbore system comprising:
an element retainer comprising a continuous single structure of a single material, the continuous single structure further comprising having a high-density region of the single material and a low-density region of the single material having a density that is lower than the high-density region, the low-density region being deformable in retaining a position of a first elastomeric element downhole in a wellbore;

a second element retainer positionable against the high-density region to apply force to the single structure; and the first elastomeric element positionable against the low-density region and compressible by the single structure in response to the second element retainer applying force to the single structure, the first elastomeric element having a first coefficient of elasticity.

10. The system of claim 9, further comprising:
a second elastomeric element compressible by the first elastomeric element in response to the continuous single structure applying force to the first elastomeric element, the second elastomeric element having a second coefficient of elasticity that is different than the first coefficient of elasticity.

11. The system of claim 10, further comprising:
a third element retainer comprising a second continuous single structure consisting of a second single material and having a second high-density region of the second single material and a second low-density region of the second single material having a density that is lower than the second high-density region, the second low-density region being deformable in retaining a position of a third elastomeric element downhole in the wellbore; and a fourth element retainer positionable against the second high-density region to apply force to the second continuous single structure, the third elastomeric element positionable against the second low-density region and compressible by the second continuous single structure in response to the fourth element retainer applying force to the second continuous single structure, the third elastomeric element having a third coefficient of elasticity, wherein the second elastomeric element is compressible by the third elastomeric element in response to the second continuous single structure applying force to the third elastomeric element, and wherein the second elastomeric element is positionable between the first elastomeric element and the third elastomeric element.

12. The system of claim 9, wherein the system is a packer useable to form a seal within an annulus in the wellbore, and wherein the element retainer is an element shoe.

13. The system of claim 9, wherein the high-density region comprises protrusions positionable circumferentially around an exterior of the high-density region to reduce circumferential force applicable to the element retainer overcome during setting.

14. The system of claim 9, wherein the low-density region comprises an inner rung portion having a hook shape for clamping against the first elastomeric element to form a seal, and wherein the low-density region is a mesh configuration.

15. The system of claim 9, wherein the low-density region comprises:
loose powder; and
a solidified exterior encapsulating the loose powder.

* * * * *